Sept. 15, 1959   C. D. EICHELBERGER ET AL   2,904,620
ELECTRIC BUS CONSTRUCTION
Filed May 14, 1956

Inventors:
Charles D. Eichelberger,
William N. Lester,
by J. Wesley Naubar
Their Attorney.

2,904,620

ELECTRIC BUS CONSTRUCTION

Charles D. Eichelberger, Ridley Park, and William N. Lester, Norwood, Pa., assignors to General Electric Company, a corporation of New York Application May 14, 1956, Serial No. 584,693

5 Claims. (Cl. 174—88)

This invention relates to an electric bus construction and, more particularly, to an insulated joint for interconnecting adjacent series-related sections of an electric bus. The invention is especially applicable to a bus of the type comprising interconnected bus sections of tubular cross-section.

Heretofore, it has been customary to insulate the joint between adjacent bus sections either by applying suitable insulating tape to the exposed parts of the joint or by pouring a molding compound into a suitable enclosure provided about the joint. Both of these processes are awkward, costly, and time-consuming and produce joints which do not readily lend themselves to quick disassembly and inspection.

Accordingly, one of the objects of our invention is to insulate such a joint by simple and inexpensive means which allows for quick assembly and disassembly of the joint.

Another object of our invention, as it applies to a joint provided between bus sections of tubular cross-section, is to minimize the extent to which the conductive parts of the joint project beyond the periphery of the bus sections. By achieving this object, it becomes possible to reduce the amount of insulation required to enclose the joint and also to reduce the centerline spacing between the buses forming adjacent phases in a polyphase distribution system.

Another object is to construct the joint in such a manner that its conductive parts always remain tightly clamped together in spite of any fatigue in the metal of the bus.

Certain features of the invention are also applicable to joints of the expansion type, which are customarily provided between certain of the bus sections of a bus run. In connection with such joints, it is an object of our invention to insulate the joint in such a manner as to permit expansion, contraction, and limited misalignment of the bus sections.

In carrying out our invention in one form, we provide a pair of tubular conductors which are disposed in end-to-end relationship. These conductors are electrically interconnected by means of at least one conductive bar which is located within the tubular conductors and is clamped in current-carrying engagement with the inner peripheral walls of the conductors. The tubular conductors are supported against lateral movement by a pair of spaced-apart insulating supports located at longitudinally-opposite sides of the joint between the conductors. The joint is enclosed by an insulating tube loosely mounted about the adjacent ends of the conductors and retained against appreciable longitudinal movement by said supports.

For a better understanding of the invention, reference may be had to the following specification taken in connection with the accompanying drawing, wherein.

Figure 1:
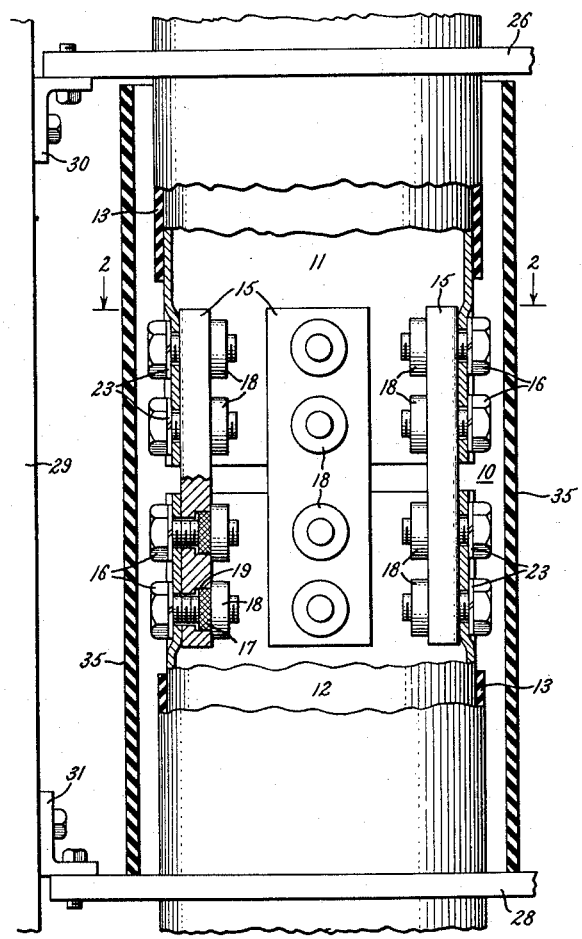
Fig. 1 is a side elevational view, partly in section, of an electric bus containing an insulated joint constructed in accordance with our invention.

Referring now to Fig. 1, there is shown an insulated joint 10 for interconnecting the adjacent ends of a pair of generally-aligned tubular bar sections 11 and 12. Each of the bus sections 11 and 12 is preferably of a cylindrical form, and each is constructed of a material of high electrical and thermal conductivity such as copper. In order that the bus sections be suitable for high-voltage installations, they are provided with suitable coatings 13 of insulation. Each of these coatings 13 preferably extends over the entire external surface of its associated bus section except for the ends of the bus section, which are left bare to allow for good electrical connections to be made between adjacent bus sections.

These connections are shown in Fig. 1 as comprising a plurality of straight bars 15, located within the tubular bus sections 11 and 12, and formed of a highly conductive material such as copper. These bars 15 are clamped in current-carrying engagement with the inner peripheral walls of the bus sections by means of bolts 16 which extend through registering apertures formed in the bars 15 and the walls of the bus sections. Each of these bolts 16 has threads which mesh with those of a steel nut 18 which has a knurled portion 17 press-fitted within a suitable recess 19 provided on the inner surface of the bar 15. This press-fit anchors the nut 18 to the bar 15 and prevents rotation of the nut with respect to the bar. Thus, the bolts 16 can be tightened entirely from outside the bus sections to securely clamp the bars 15 in engagement with the inner peripheral walls of the bus sections. The nuts 18 have enlarged portions at their outer ends to provide an adequate bearing surface between each of the nuts 18 and its corresponding bar 15.

The use of a nut, such as 18, instead of threads formed directly in the copper bar 15, for receiving the bolt threads is advantageous in that the nut, which is preferably of steel, can provide much stronger threads than could be provided from the copper of the bar. The use of the knurled portions 17, or other suitable means, for securing the nuts against rotation facilitates the assembly operation by permitting the clamping action to be performed entirely from outside the tubes without the need for access to the interiors thereof.

Figure 2:
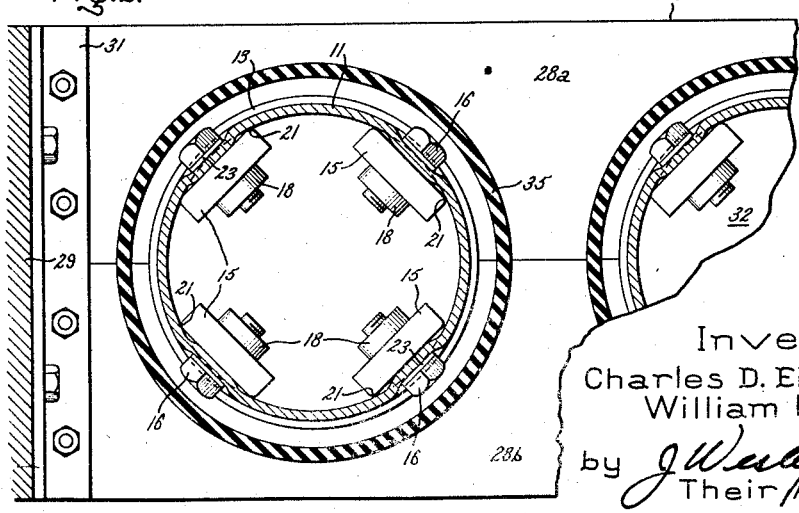
Fig. 2 is a sectional view taken along the line 2—2 of Fig. 1.

As can be best seen in Fig. 2, each of the conductive bars 15 has a generally-flat radially outer surface and has spaced-apart edges 21 which extend longitudinally of the tubular bus sections 11 and 12. In its unstressed condition, each of the bus sections is of a smooth cylindrical configuration, as shown by the dotted lines of Fig. 2. But when the bolts 16 are tightened, those portions of the bus section wall which extend circumferentially between the edges 21 are deformed and forced into engagement with the bar 15 by the clamping action of the bolts. As a result, high-pressure contact is established in the area immediately surrounding the bolt-receiving apertures as well as at the edges 21 of the bars 15, thus providing additional surfaces through which current may be transferred between the bars 15 and the bus sections. Another advantage which results from establishing the above high pressure engagement in the region immediately surrounding the bolt-receiving aperture is that no loosening of the bolt will result from fatigue which may eventually occur in the copper walls of the bus section. Any relaxation of the copper due to fatigue will not significantly affect our threaded connection because the adjacent parts, all being clamped in engagement with each other, are not free to yield as a result of such relaxation. Suitable lock washers 23 positioned between the bolt heads and the outer periphery of the tubular conductors 11 and 12 provide further assurance against loosening of the bolts 16.

The ability of each of the bolts 16 to deform the wall of the bus section and to force it into engagement with the bar 15, as described above, depends to a large extent upon the bearing area between the bolt head or the washer and the outer peripheral surface of the tubular bus section. In this regard, we have found that the dimension of the bearing area which extends in a direction between the edges 21 of the bar 15 should be substantially smaller than the actual distance between these edges 21.

The bus sections 11 and 12 of Figs. 1 and 2 are supported against lateral movement by means of axially-spaced insulating supports 26 and 28 which are shown located at axially opposite sides of the joint 10 and secured to a grounded-frame 29 by means of angle irons 30 and 31. As illustrated in Fig. 2, each of these supports 26 and 28 has a central opening which fits closely about its associated bus section. Each of the supports is also of a two-part construction to facilitate assembly and disassembly of the bus. In Fig. 2, the two parts of support 28 are designated 28a and 28b and are located on transversely-opposite sides of the associated bus section 12. If the bus is part of a polyphase distribution system, then these supports 26 and 28 are utilized for supporting all of the adjacent phases against lateral movement with respect to each other. This is illustrated in Fig. 2, where a second phase 32 is shown mounted adjacent the above-described phase.

To provide insulation about the above-described joint between the bus sections 11 and 12, we provide a tube 35 of insulating material which fits loosely about the adjacent ends of the two bus sections. This tube 35 is confined against axial movement by means of the two spaced-apart bus supports 26 and 28 located at its opposite ends, and, as a result, there is no danger of the joint becoming accidentally exposed by displacement of the tube. Since the bus supports 26 and 28 are capable of positioning the insulating tube 35, as well as performing the usual bus-supporting functions, it will be apparent that no additional means is required for holding the tube in the proper operative position.

If it is desired to inspect the conductive parts of the joint, this can be done very quickly simply by removing one of the two-part bus supports, say 28, and sliding the tube back in telescoping relationship on the bus section 12, thereby exposing the conductive parts of the joint. The parts can be restored to the condition of Fig. 1 simply by returning the tube 35 to the position of Fig. 1 and then reassembling the support 28. Thus, it will be apparent that the use of this insulating tube 35 permits the joint to be assembled and disassembled with far more ease than would be required if the parts were taped or were imbedded in a molded compound.

Because the conductive bars 15 are located within the tubular bus sections, rather than externally thereof, the extent to which the conductive parts of the joint project radially beyond the external periphery of the bus sections is minimized. This permits a reduction in the size of insulating tube (35) needed to enclose the joint and also permits a reduction in the center-line spacing between adjacent buses of a polyphase distribution system without lowering the system insulating level. Where the frame 29 is part of an enclosure, this feature also permits a reduction in the size of such enclosure.

To allow for an additional reduction in the center-line spacing between adjacent buses without a corresponding reduction in the insulation level, the conductive bars 15 have been located at points which are circumferentially offset from the region at which the adjacent buses are in closest proximity. For example, in Fig. 2, the bars 15 are shown displaced approximately 45 degrees from the centrally located region where the adjacent buses are closest together. Thus, the projecting heads of the clamping bolts 16 on adjacent phases are spaced apart to a greater extent than would otherwise be possible.

Figure 3:
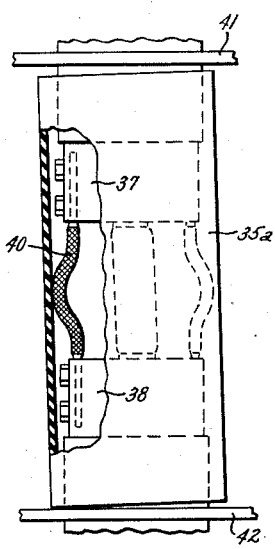
Fig. 3 is a side elevational view partly in section showing a modified form of our invention.

The insulating means of this invention is especially well suited for use in connection with expansion joints, which are normally provided between certain of the bus sections of an extended bus run. A joint of this type is shown in Fig. 3 where the spaced-apart ends of a pair of tubular bus sections 37 and 38 are interconnected by flexible conductive braid 40 suitably secured to the bus sections. An insulating tube 35a, corresponding to the tube 35 of Fig. 1, is loosely mounted about the joint and is maintained in this position by bus supports 41 and 42, corresponding to the supports 26 and 28 of Fig. 1. During expansion and contraction of the bus, the bus sections 37 and 38 are free to move toward and away from each other without any interference from the loosely-mounted sleeve 35a. The loose mounting of the sleeve 35a also desirably allows for an appreciable degree of misalignment between the adjacent bus sections.

In the specification and in the claims, the terms "tube" and "tubular" are intended to be definitive of hollow elongated members of any cross-section.

While we have shown and described particular embodiments of our invention, it will be obvious to those skilled in the art that various changes and modifications may be made without departing from the invention in its broader aspects, and we, therefore, intend in the appended claims to cover all such changes and modifications as fall within the true spirit and scope of the invention.

What we claim as new and desire to secure by Letters Patents of the United States is:

1. An electric bus construction comprising a pair of tubular conductors disposed in end-to-end relationship and coated with insulation except at their ends, at least one conductive bar located within said tubular conductors and extending therebetween, means for clamping said bar in current-carrying engagement with the inner peripheral walls of said tubular conductors, a pair of insulating supports for said conductors located in spaced-apart relationship on longitudinally opposite sides of the joint between said conductors, and a tube of insulating material loosely mounted about the adjacent ends of said conductors and enclosing said joint, said tube being disposed between said insulating supports and confined by said supports from moving longitudinally out of enclosing relationship with said joint.

2. An electric bus construction comprising a pair of tubular conductors of curvilinear cross-section disposed in end-to-end relationship, at least one conductive member located within said tubular conductors and extending therebetween, said member comprising a bar portion having spaced apart edges extending longitudinally of said tubular conductors, and clamping means for forcing said edges into current-carrying engagement with the inner peripheral walls of one of said tubular conductors and for forcing the portions of said one tubular conductor located circumferentially between said edges into current-carrying engagement with said bar portion intermediate its edges.

3. An electric bus construction comprising a pair of tubular conductors disposed in end-to-end relationship, at least one conductive member located within said tubular conductors and extending therebetween, said member comprising bar portions having spaced-apart edges extending longitudinally of said tubular conductors and conductively engaging the inner peripheral walls of said conductors, said tubular conductors having located between said edges arcuate wall portions which when unstressed are spaced from said bar portions, and clamping means extending between said arcuate wall portions and said bar portions for deforming said arcuate wall portions and forcing the central region thereof into current carrying engagement with said bar portions.

4. The combination of claim 3 in which said clamping means acts through a predetermined bearing area on the outer periphery of each of said tubular conductors, said bearing area having in a direction extending between said edges a dimension which is substantially smaller than the actual distance between said edges.

5. An electric bus construction comprising a pair of conductors disposed in end-to-end relationship, flexible means conductively joining the adjacent ends of said conductors and permitting expansion, contraction, and misalignment thereof, a pair of insulating supports for said conductors located in spaced apart relationship on longitudinally opposite sides of the joint between said conductors, and a tube of insulating material loosely mounted about the adjacent ends of said conductors, said tube being disposed between said insulating supports and confined from appreciable longitudinal movement by said supports.

References Cited in the file of this patent

UNITED STATES PATENTS

| | | |
|---|---|---|
| 2,057,266 | Rippere | Oct. 13, 1936 |
| 2,246,370 | Lewis | June 17, 1941 |
| 2,421,480 | Burge | June 3, 1947 |